Nov. 10, 1970  P. S. HAST  3,538,693
LAWN-MOWERS
Original Filed Dec. 6, 1966
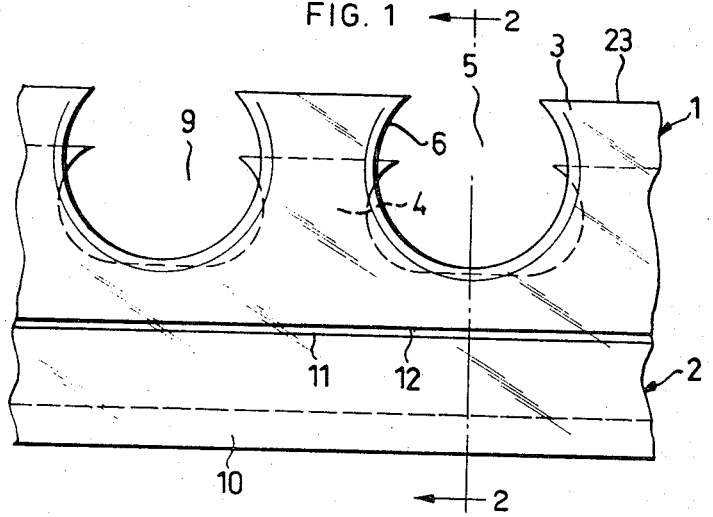
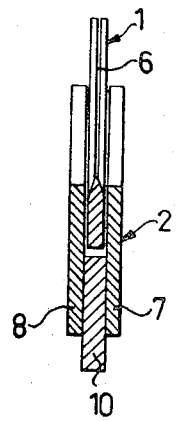
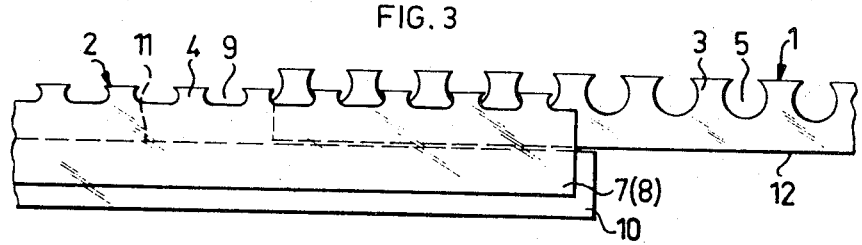
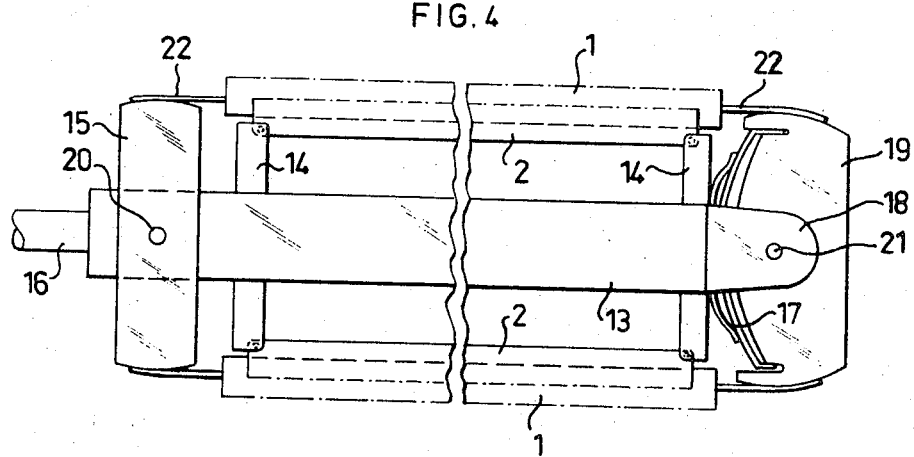
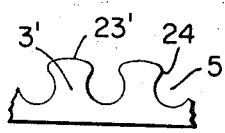
INVENTOR:
PER S. HAST
Browne, Schuyler & Beveridge
ATTORNEYS

United States Patent Office 3,538,693
Patented Nov. 10, 1970

3,538,693
LAWN-MOWERS
Per Sigvard Hast, Hastholmsvagen 10,
Stockholm, Sweden
Continuation of application Ser. No. 599,518, Dec. 6, 1966. This application Aug. 11, 1969, Ser. No. 853,102
Int. Cl. A01d 55/02
U.S. Cl. 56—296                                  10 Claims

ABSTRACT OF THE DISCLOSURE

A hedge trimmer blade assembly comprising a longitudinally reciprocable cutting blade having teeth projecting transversely thereof and terminating in straight aligned edges extending generally parallel to the blade axis; and a fixed bar having transversely extending teeth which also terminate in straight aligned free edges extending parallel to those of the reciprocable blade. The teeth of the cutting blade project beyond those of the fixed bar and are of a width increasing towards their substantially straight free edges. The teeth of the fixed bar similarly increase in width towards their free straight edges.

---

This application is a continuation of my prior copending U.S. application Ser. No. 599,518 filed Dec. 6, 1966 and which has since been abandoned.

This invention relates to a lawn-mower, hedge cutting machine and the like, comprising a metal cutting blade with teeth projecting transversely of the blade, and a fixed bar with transversely extending teeth, said cutting blade being imparted a reciprocating movement in relation to said fixed bar. The main characteristic features of the invention are that the teeth of the cutting blade project beyond the teeth of the fixed bar and are of a width increasing toward the free tooth apices so that the free apices of the cutting blade teeth at the reciprocating movement of the cutting blade serve as feed means for the grass stalks etc. to be cut, and that the teeth of the fixed bar are so shaped that during the mowing operation proper they retain in collaboration with the teeth of the cutting blade the grass stalks fed into the mower by the cutting blade. The invention therefore provides a very efficient lawn-mower or hedge cutting machine which can be given a very light-weight construction and the movable parts are extremely light-weight, which results in lower power consumption.

These and further features of the invention and the advantages gained thereby will become apparent from the following description in which reference is made to the accompanying drawing illustrating an embodiment, chosen by way of example, of the lawn-mower.

In the drawing:

FIG. 1 is a side view of parts of the cutting blade and the fixed bar in engaged relationship;

FIG. 2 is a cross-section of the cutting blade and the fixed bar in engaged relationship, the cross-section being taken generally along lines 2—2 of FIG. 1;

FIG. 3 is a side view, on a smaller scale, of the cutting blade and the fixed bar in partly engaged position;

FIG. 4 is a side view, on a still smaller scale, of the lawn-mower proper.

FIG. 5 is a fragmental, side view of a modified cutting blade.

The cutting blade 1 of the lawn-mower is imparted a reciprocating movement in relation to a fixed bar 2 in the lawn-mower. Both the cutting blade 1 and the fixed bar 2 are provided with teeth 3 and 4, respectively, extending transversely of said cutting blade and said fixed bar.

The cutting blade 1 consists of a resilient metal blade which shall be tensioned in position of use in the lawn-mower. The teeth 3 of the cutting blade 1 are formed by the portions remaining after recesses 5 have been provided at one edge of the cutting blade. These recesses 5 are preferably circular and larger than a semi-circle. In the preferred embodiment shown the circular recesses 5 have a depth approximately equal to three quarters of the diameter of the recesses 5. The edges of the recesses 5 constitute sharp cutting edges 6 which are situated substantially in the median plane of the cutting blade 1, which is important in order that the teeth 3 should not get stuck in the teeth 4 of the fixed bar 2 during reciprocating movement of the cutting blade 1.

The fixed bar 2 consists of a pair of resilient metal blades 7 and 8 which are disposed opposite one another at a relative distance corresponding to the thickness of the cutting blade 1 and which are provided at one edge with registering recesses 9, the tooth shaped portions between said recesses 9 constituting the teeth 4 of the fixed bar 2. The metal blades 7 and 8 are separated by a metal blade 10 which is slightly thicker than the cutting blade 1 so that the latter runs smoothly between said metal blades 7 and 8. With a thickness of the cutting blade 1 of about 0.5 mm. the thickness of the metal blade 10 may be from 0.6 to 0.7 mm. The edge 11 of the metal blade 10 facing the teeth 4 is spaced from said teeth and can serve as a guide for the edge 12 of the cutting blade 1 facing away from the teeth 3 thereon. The metal blades 7, 8, and 10 can be united by point-welding, gluing or in any other desired manner.

The fixed bar 2 constituted by the resilient metal blades 7, 8 and 10 should be clamped in the lawn-mower at least when it is of a length greater than half a meter.

Like the teeth 3 of the cutting blade 1, the teeth 4 of the fixed blade 2 are disposed perpendicularly to the longitudinal direction of the bar and are of a width increasing toward the free tooth apices.

As will appear from the drawing, the teeth 3 of the cutting blade 1 reach with their apices beyond those of the teeth 4 of the fixed bar 2. Thus, the apices of the teeth 4 approximately are at a level with a line drawn through the centers of the circular recesses 5. On the other hand, the bottoms of the edge recesses 5 and 9 in the cutting blade 1 and the fixed bar 2, respectively, are at a level with each other. The teeth 3 and 4 of the cutting blade 1 and the fixed bar 2 have the same width and are located at an equally large distance from each other so that they can be opposite each other. From such a position the teeth 3 of the cutting blade 1 shall move a whole number of spacings, e.g. two, at the reciprocating movement of the cutting blade 1.

In the embodiment shown in FIG. 5 the outer edges 23' of the teeth 3' shall bulge slightly outward while the transitions 24 between said edges 23' and the recesses 5' shall be rounded. This embodiment has been chosen exclusively for safety reasons as the FIG. 1 embodiment having straight edges 23 ensures the same cutting function of the lawn-mower.

The recesses 5 and 9 are preferably realized by punching but may also be provided in any other desired manner.

The lawn-mower shown in FIG. 4 has two sets of cutting blades 1 and fixed bars 2, for the machine incorporates a tube 13 provided with fixed bars 2 which extend longitudinally in diametrically opposed relationship and which are clamped between fastenings 14. The cutting blades 1 are to cooperate with the fixed bars 2 and are imparted for this purpose a reciprocating movement in that their one ends are actuated by a movement transmitting mechanism while their other ends coact with a member 15 pivoted to the tube 13.

The movement transmitting mechanism is a shaft 16 driven by for example a motor and traversing the tube 13, said shaft having its end portion so connected over an intermediary coupling element 17 to a member 19 pivoted to a frame 18 that said last mentioned member 19 is imparted a oscillating pivoting movement about axis 21 when the shaft is rotated. The tilting movement of the member 19 thus imparts the reciprocating movement to the cutting blades 1.

The outer sides of the members 15 and 19 are circularly curved having the pivot axes 20 and 21 as their centers. Said outer sides of the members are so connected with the cutting blades 1 by leaf springs 22 or like means that said cutting blades will effect a reciprocating movement without any lateral movement whatever. The leaf springs 22 thus slide on the outer sides of the members 15 and 19.

The connection of the cutting blades 1 with the leaf springs 22 should be easily releasable to permit exchange of the cutting blades 1.

The above embodiment of the invention was described for purposes of illustration rather than limitation. Variations and modifications of the invention are possible.

I claim:

1. A blade assembly for mowing lawns comprising, a fixed bar, a movable metal cutting blade, and means mounting the cutting blade in side-by-side relation with the bar and for longitudinal reciprocatory movement relative to the bar, said cutting blade having a plurality of teeth projecting transversely thereof and terminating in substantially straight aligned free edges extending parallel to the longitudinal axis of the blade, said teeth being spaced from each other by transversely extending recesses with the width of the teeth constantly increasing from intermediate portions thereof to the free straight edges thereof, said free straight edges of said blade teeth terminating at their opposite ends at apices located at the mouths of said recesses, said bar having a plurality of transversely extending teeth and a plurality of transversely extending recesses respectively located between said teeth, said blade teeth projecting transversely sufficiently beyond said bar teeth for catching and retaining grass stalks between the teeth for cutting upon reciprocation of the movable cutting blade during use of the assembly.

2. The assembly defined in claim 1 wherein the recesses in the movable cutting blade and the recesses in the fixed bar have bottom edges lying approximately at the same level with each other.

3. The blade assembly as defined in claim 1 wherein said bar teeth have front free edges which are straight and aligned with each other.

4. The blade assembly defined in claim 3 wherein the width of said bar teeth increases towards the said front free edges thereof.

5. The blade assembly defined in claim 4 wherein said front free straight edges of said bar teeth terminate at their opposite ends in apices located at the mouth of the recesses in the bar.

6. The assembly defined in claim 4 wherein the teeth of the movable cutting blade and the teeth of the fixed bar have approximately the same width and the same spacing.

7. The blade assembly defined in claim 1 wherein said fixed bar includes a pair of blades disposed in laterally spaced parallel relationship, separator means fixed to and separating said bar blades a distance slightly greater than the thickness of the movable cutting blade, said cutting blade being received for longitudinal reciprocable movement between said bar blade, said bar blades having a plurality of recesses with the recesses in one bar being transversely aligned and in registry with recesses on the other bar blade, said bar teeth being formed between the recesses in said bar blades.

8. The assembly defined in claim 7 wherein said teeth of said cutting blade have sharp cutting edges located substantially in a median plane of the movable cutting blade.

9. The blade assembly defined in claim 1 wherein said recesses in said movable cutting blade are circular and extend circumferentially a distance greater than a semicircle and have a depth approximately equal to three-quarters (¾) of the diameter thereof.

10. A blade assembly for mowing lawns comprising, a fixed bar, a movable metal cutting blade received in said fixed bar for longitudinal slidable movement relative to the fixed bar in a plane generally parallel to the fixed bar, said fixed bar being comprised of a pair of bar blades extending in laterally spaced parallel interrelationship and an elongated separator blade fixed to and between said bar blades to define therewith an elongated space slidably receiving said movable cutting blade for longitudinal reciprocatory movement in the space between said fixed bar blades, said movable cutting blade having a plurality of teeth projecting transversely thereof and terminating in substantially straight aligned free edges extending parallel to the longitudinal axis of the blade, said blade teeth being spaced from each other by transversely extending recesses with the width of the teeth increasing towards the free straight edges thereof, said free straight edges of said movable teeth terminating at their opposite ends at apices located at the mouths of said recesses, said bar blades having a plurality of recesses with the recesses in one bar blade being transversely aligned in registry with the recesses in the other bar blade, said bar blades having a plurality of transversely extending teeth formed between the recesses thereof, said separator blade having a longitudinal edge received between said bar blades and being spaced inwardly from the teeth of said bar blades to define said space receiving said movable cutting blade, said movable blade teeth projecting transversely sufficiently beyond said teeth in said fixed bar blades for catching and retaining grass stalks in the recesses between the teeth for cutting the grass stalks during use of the assembly.

References Cited

UNITED STATES PATENTS

| | | | |
|---|---|---|---|
| 2,558,459 | 6/1951 | Podner. | |
| 2,596,078 | 5/1952 | Prohaska | 30—221 X |
| 3,074,221 | 1/1963 | Martins. | |
| 3,083,518 | 4/1963 | Hultquist | 56—296 X |
| 3,098,338 | 7/1963 | Myers | 56—296 |

FOREIGN PATENTS 670   6/1926   Australia.

LOUIS G. MANCENE, Primary Examiner

J. N. ESKOVITZ, Assistant Examiner

U.S. Cl. X.R.

30—224